(12) United States Patent
Tulkoff et al.

(10) Patent No.: US 7,676,486 B1
(45) Date of Patent: Mar. 9, 2010

(54) METHOD AND SYSTEM FOR MIGRATION OF LEGACY DATA INTO A CONTENT MANAGEMENT SYSTEM

(75) Inventors: Michael C. Tulkoff, Austin, TX (US); Jeffrey M. Collins, Austin, TX (US)

(73) Assignee: Vignette Software LLC, Austin, TX (US)

( * ) Notice: Subject to any disclaimer, the term of this patent is extended or adjusted under 35 U.S.C. 154(b) by 354 days.

(21) Appl. No.: 10/716,093

(22) Filed: Nov. 18, 2003

Related U.S. Application Data

(60) Provisional application No. 60/472,971, filed on May 23, 2003.

(51) Int. Cl.
G06F 7/00 (2006.01)
G06F 17/00 (2006.01)

(52) U.S. Cl. .................. 707/102; 707/2; 707/3; 707/8; 707/9; 707/10; 707/101; 707/104.1; 707/203; 707/204

(58) Field of Classification Search .................. 707/102, 707/103 R, 103 Y, 103 X
See application file for complete search history.

(56) References Cited

U.S. PATENT DOCUMENTS

| | | | | |
|---|---|---|---|---|
| 6,604,110 | B1 * | 8/2003 | Savage et al. | 707/102 |
| 6,826,727 | B1 * | 11/2004 | Mohr et al. | 715/517 |
| 6,850,893 | B2 | 2/2005 | Lipkin | |
| 6,898,609 | B2 * | 5/2005 | Kerwin | 707/203 |
| 6,910,040 | B2 * | 6/2005 | Emmick et al. | 707/8 |
| 7,062,705 | B1 | 6/2006 | Kirkwood et al. | 715/500 |
| 7,069,271 | B1 | 6/2006 | Fadel et al. | 707/102 |
| 7,117,252 | B1 | 10/2006 | Kumakura | 709/217 |
| 7,188,332 | B2 | 3/2007 | Charisius et al. | 717/104 |
| 7,415,484 | B1 * | 8/2008 | Tulkoff et al. | 707/104.1 |
| 2002/0049626 | A1 * | 4/2002 | Mathias et al. | 705/10 |
| 2002/0111989 | A1 * | 8/2002 | Ambler et al. | 709/202 |
| 2002/0138436 | A1 * | 9/2002 | Darling | 705/51 |
| 2002/0147644 | A1 | 10/2002 | Subramanian et al. | 705/14 |
| 2003/0065898 | A1 * | 4/2003 | Flamma et al. | 711/165 |
| 2003/0074342 | A1 * | 4/2003 | Curtis | 707/1 |
| 2003/0105654 | A1 * | 6/2003 | MacLeod et al. | 705/7 |
| 2003/0105770 | A1 * | 6/2003 | MacLeod et al. | 707/103 R |
| 2003/0149934 | A1 | 8/2003 | Worden | 715/513 |
| 2003/0195885 | A1 * | 10/2003 | Emmick et al. | 707/8 |
| 2003/0195923 | A1 * | 10/2003 | Bloch et al. | 709/203 |
| 2003/0208397 | A1 * | 11/2003 | VanDusen | 705/14 |
| 2004/0015908 | A1 * | 1/2004 | Giel et al. | 717/141 |
| 2004/0054923 | A1 * | 3/2004 | Seago et al. | 713/201 |
| 2004/0107356 | A1 * | 6/2004 | Shamoon et al. | 713/193 |
| 2004/0122849 | A1 | 6/2004 | Nelson | |

(Continued)

*Primary Examiner*—Hosain T Alam
*Assistant Examiner*—Usmaan Saeed
(74) *Attorney, Agent, or Firm*—Sprinkle IP Law Group

(57) ABSTRACT

Systems and methods are described which facilitate the integration of data into a content management system. Legacy data is inspected, and content types are generated based on a data model. From these content types, content type objects may be generated. The data may then be examined to acquire a key set, and a content instance object generated for each datum found which matches a content type. This content instance object can then be associated with the datum using one or more key values, saved, and subsequently used to manage the data. These methods and systems allow data to be migrated to a content management system without any modification to the existing data repository or its associated structures.

24 Claims, 3 Drawing Sheets

U.S. PATENT DOCUMENTS

| | | | |
|---|---|---|---|
| 2004/0161734 A1* | 8/2004 | Knutson | 434/335 |
| 2004/0187100 A1* | 9/2004 | Thiruvillamalai | 717/141 |
| 2004/0205075 A1 | 10/2004 | LaTurner | |
| 2004/0236801 A1* | 11/2004 | Borden et al. | 707/204 |
| 2005/0044103 A1 | 2/2005 | MacLeod | |
| 2005/0138081 A1* | 6/2005 | Alshab et al. | 707/200 |
| 2006/0059253 A1* | 3/2006 | Goodman et al. | 709/223 |
| 2006/0195816 A1* | 8/2006 | Grandcolas et al. | 717/101 |
| 2009/0106779 A1* | 4/2009 | Tulkoff et al. | 719/328 |

* cited by examiner

METHOD AND SYSTEM FOR MIGRATION OF LEGACY DATA INTO A CONTENT MANAGEMENT SYSTEM

RELATED APPLICATIONS

This application claims a benefit of priority under 35 U.S.C. § 119(e) to U.S. Patent Application No. 60/472,971 entitled "A System and Method for the Migration of Legacy Data Into Content Management Data Objects" by Michael C. Tulkoff and Jeffrey M. Collins; filed May 23, 2003. This application is related to U.S. patent application Ser. No. 10/434,936 entitled "Method and System for Modeling of System Content for Businesses" by Michael C. Tulkoff and Mark Scheevel; filed May 9, 2003. All applications cited within this paragraph are assigned to the current assignee hereof and are fully incorporated herein by reference.

TECHNICAL FIELD OF THE INVENTION

This invention relates in general to methods and systems for managing content, and more particularly, to methods and systems for migrating existing data to a content management system using content types modeled on data usage.

BACKGROUND OF THE INVENTION

In a computing environment, data is of the utmost importance. Data is input into a system, manipulated, and commensurately output. Data, or content, is particularly important to a web site, as various forms of content are presented to a visitor to the site. However, as the size of web sites expands, and their functionality increases, managing the content utilized at these websites becomes increasingly more complicated. The amount of content deployed increases rapidly with the expansion of the site, and the organization of, and relationships between, this content is constantly in flux.

To deal with the volume of content, many managers of computer environments, or publishers of websites, may wish to utilize a content management system. Particular foibles of certain content management systems, however, make their use less than ideal. For example, many extant systems do not understand the complex relationships between the content. Other systems may not allow an accurate representation of the varied nature of the content present and the contents' associated attributes and requirements. Some systems provide such an inhospitable environment that their use itself is a barrier to their effectiveness, requiring extensive training in programming and the locale of information to effectively manage content.

A few select content management systems have managed to obviate these problems by using content types to model the content of a site according to the site's own vocabulary. These content types may use the vocabulary and business rules used by a particular enterprise within which the users work. Business data objects may be instantiated from the content types and may include attributes, and workflow, access controls. Content management systems of this ilk allow a layer of abstraction to be fitted to the content which represents the complex relationships between the data in the terms defined by the users.

Consequently, many sites may wish to migrate their data to content management systems of this type. Previous methods for migrating this data to a content management system involved manually entering this data into a proprietary content management repository, defining content types and associating this legacy data with the defined content types. This method was time consuming and expensive, in part because it did not allow the persistence of content management metadata across content management systems and required the migration of data from one repository to the next.

Thus, there is a need for systems and methods of migrating data to a content management systems that can migrate existing, large data repositories without changing either the structure or the location of the data, while simultaneously allowing any existing content management metadata to be persisted.

SUMMARY OF THE INVENTION

Systems and methods for the migration of legacy data to a content management system are disclosed. These methods allow data to be integrated into a content management system using content types based on how the data is actually modeled, used and related. A user's existing data may be inspected, and content types created from this data. The users data can then be associated with these content types. The data is then managed using these content types, obviating any need to manipulate the data itself, or to move the data to an additional repository.

In some embodiments, the content types may be generated by specifying attributes.

In another embodiment, content types may be used to instantiate content instance objects, and these content instance objects associated with the data.

In yet other embodiments, these content instance objects are saved, and the data is managed using these content instance objects.

In another set of embodiments, these content instance objects are associated with the data using keys.

In other similar embodiments, these keys are acquired by querying a database which holds data.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals designate the same components. The invention may be better understood by reference to one or more of these drawings in combination with the description presented herein. It should be noted that the features illustrated in the drawings are not necessarily drawn to scale.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

A few terms are defined or clarified to aid in understanding the descriptions that follow. A network includes an interconnected set of server and client computers over a publicly available medium (e.g., the Internet) or over an internal (company-owned) system. A user at a client computer may gain access to the network using a network access provider.

The term "content type" is intended to mean a structured definition of an object used to instantiate other objects. The definition may comprise attributes and related data, including workflow, security, status, or other information. The content types can be used for instantiating content type objects and content instance objects.

The term "business content type" is intended to mean a content type defined in terms of a user's business context.

The term "content type object" is intended to mean an instantiation of a particular content type, embodied in a content management system.

The term "content instance object" is intended to mean an instantiation of a content instance and may be associated with a particular content type object or content type.

The term "business user" is intended to mean a person having little, if any, training in computer programming and writing code in a programming language.

Attention is now directed to systems and methods for migrating legacy data to a content management system. These systems and methods may be used to migrate existing data from one content management system to another, or to utilize a content management system with previously unmanaged data. Additionally, these systems and methods can utilize automated data analysis procedures to create content types based on a set of data, to acquire the keys and attributes of a set of data, associate this metadata with the legacy data, and persist this metadata for use with a content management system. This metadata in turn allows a content management system to manage legacy data without changing the structure of the data, moving the data to another repository, or manually re-entering the data.

Figure 1:
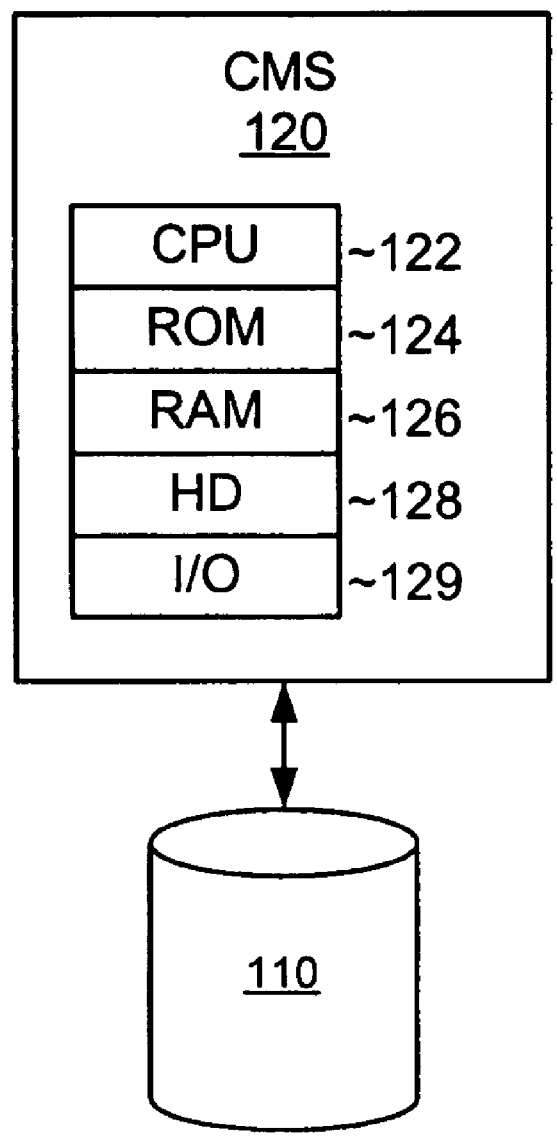
FIG. 1 is a diagram of an embodiment of a content management system.

Before discussing embodiments of the present invention, an exemplary hardware architecture for using embodiments of the present invention is described. FIG. 1 illustrates an exemplary architecture where content management system ("CMS") on computer 120, can be used to manage data residing in database 110. CMS 120 can be bi-directionally coupled to database 110, which may contain data objects and metadata regarding those objects residing in tables within those databases. CMS 120 and database 110 may be part of a network site. Note that FIG. 1 is a simplification of a hardware configuration.

Within CMS 120, a plurality of computers (not shown) may be interconnected to each other via an internal network or a combination of internal and external networks. The computer on which CMS 120 may execute can include central processing unit ("CPU") 122, read-only memory ("ROM") 124, random access memory ("RAM") 126, hard drive ("HD") or storage memory 128, and input/output device(s) ("I/O") 129. I/O 129 can include a keyboard, monitor, printer, electronic pointing device (e.g., mouse, trackball, etc.), or the like.

Additionally, CMS 120 may have one or more of a content delivery software component, a page generator software component, the content management software component, an applications software component, and the like. The data, content, and their metadata, if any, may be located within any or all of, CMS 120, and database 110 or other databases (not shown).

Portions of the systems and methods described herein may be implemented in suitable software code that may reside within ROM 124, RAM 126 or HD 128. In addition to those types of memories, the instructions in an embodiment of the present invention may be contained on a data storage device with a different machine readable storage medium, such as a hard disk. Alternatively, the instructions may be stored as software code elements on a DASD array, magnetic tape, floppy diskette, optical storage device, or other appropriate machine readable medium or storage device.

In an illustrative embodiment of the invention, the machine-executable instructions may be lines of compiled C++, Java, or other language code. Other architectures may be used. For example, the functions of any of the systems and methods may be performed by different computers than are shown in FIG. 1. Additionally, a computer program or its software components with such code may be embodied in more than one machine readable medium in more than one computer.

In the hardware configuration above, the various software components (e.g., content delivery, page generator, content management, or the like) may reside on a single computer or on any combination of separate computers. In alternative embodiments, some or all of the software components may reside on the same computer. For example, the content delivery software component and the page generator software component could reside on the same computer.

Figure 2:
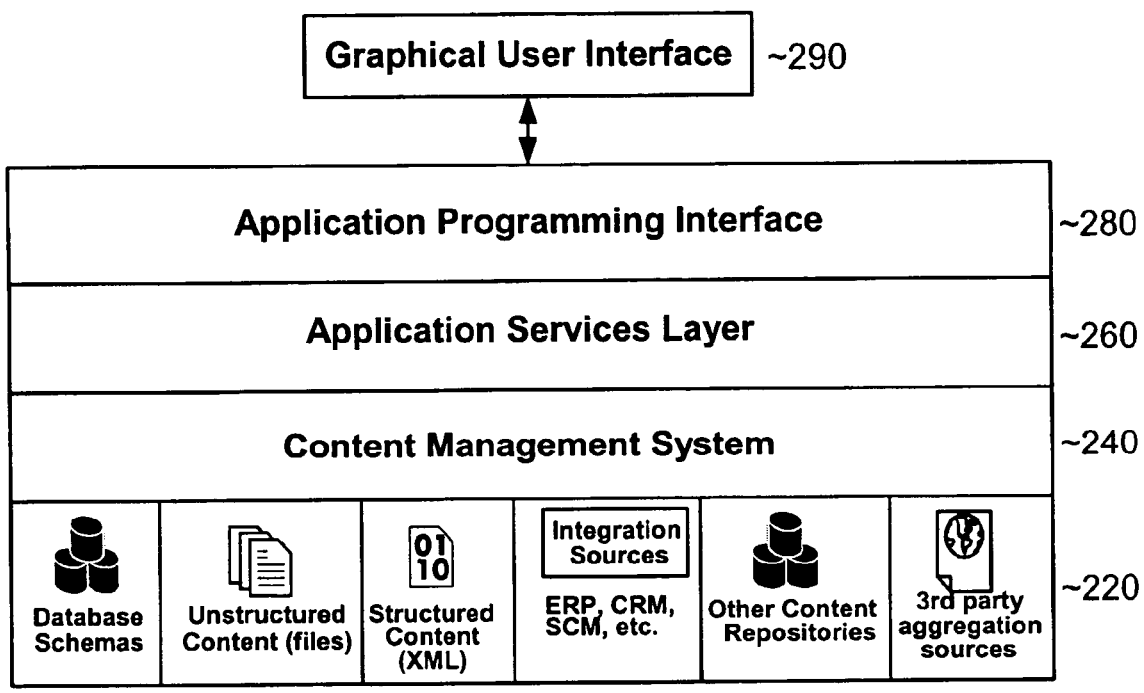
FIG. 2 is a representation of logical layers used in certain content management systems.

Moving on to FIG. 2, a representation of the layered approach taken by many content management systems which utilize content types is depicted. Persistence layer 220 can include all objects, records, metadata for the objects and records, and other data used at a network site (collectively "data"). This data may reside in a variety of persistent data sources such as databases, unstructured content (e.g., text files, image files, etc.), structured content (e.g., XML documents), integration sources (e.g., Enterprise Resource Planning ("ERP"), Customer Relationship Management ("CRM"), Software Configuration Management ("SCM"), etc.), other content repositories, and third party aggregation sources (e.g., news wire services, etc.).

Content management system ("CMS") 240 can control and manage the data within persistence layer 220. Application services layer 260 overlies CMS 240 and provides an interface to CMS 240 that allows operations to be performed on data within persistence layer 220. API 280 overlies application services layer 260. Other APIs to application services layer 260 may be present but are not shown in FIG. 2.

The interfaces from application services layer 260 (to GUI 290) and CMS 240 (to application services layer 240) may be generic. With such a configuration, other user interfaces (not shown) to API 280 may be added with little additional complexity. Also, other software components (not shown) above CMS 240 and at the same level as application services layer 260 may be easily added.

GUI 290 can be coupled to API 280 and allows business users to generate, modify, and delete higher-level objects (i.e., objects that reference or contain other data within persistence layer 220) and allows content types to be generated in a manner consistent with how an enterprise thinks about its content. Because the content types are objects that reside at a higher level compared to records and objects at leaf nodes (i.e., objects that do not refer to other objects), GUI 290 can allow business users to generate, modify, or delete content types without having to know a programming language. GUI 290 can be a user friendly, web-based modeling tool that may be used after little training.

The time from installation of the methods and system described herein to launch of content can be performed much more quickly and at a fraction of the cost (since programmers are not required the time to generate the content types is faster than coding. The content types essentially replace conventional templates that required programmers to code. Further, unlike conventional templates, the content types may have an associated workflow and access controls to allow for a more automated development, processing, deployment of content, and a role-based monitoring system for monitoring the business data objects instantiated from the business content types.

GUI 290 may allow users to model content types in terms of a business's needs and in a business' own vocabulary. Content types may be thought of as "recipes" for subsequently instantiated objects from those content types. The content type is used to manage instances being created from that content type. The content types can be defined to include attributes and potentially other information. A user may use a graphical user interface or other interface for defining the content type. When the content type is saved, CMS 240 may automatically serializes the input to create a structure definition of the content type that may be persisted in database 110. The structured definition may be in XML. Alternatively, the structured definitions may be generated in a different manner or expressed in a different language.

The content types may be defined in a logical order. More specifically, base or leaf content types may be defined before composite content types. The base or leaf content types do not refer to other any other content type, whereas a composite content type refers to at least one other content type. Simply put, the base or leaf content type should exist for it to be referenced by a composite content type. The content types may include references to one or more content types. Information regarding the content types will be addressed later in this specification.

In one example, a content type of "article" can include a title, an author, an image, and text attributes. The title, image, and text may be at leaf nodes and not refer to any other objects. The author may come from an author table within database 110 and may also be a content type. Therefore, an article content type can be a composite content type because it refers to another content type, namely an author content type. The author content type should be created before the article content type to comply with referential integrity constraints.

The attributes may be used to locate referenced objects, files, and records. One of the attributes may reference a file. If so, the reference can be the file name for the file. For a record from a table in one of the databases 110, the reference can include a reference to a database and the column with primary keys for the database table.

Part of defining content types may include annotating policy information. Predefined policies may used be for deployment, promotion, demotion, packaging, and potentially other purposes may be within the annotations. CMS 240 may include business rules for acting on records, files, and objects to ensure that referential integrity constraints are met. Using the relationship and policy information, CMS 240 may determine which, if any, references are relevant for a particular purpose.

Depending on the policy, different sets of data objects may be significant or insignificant to a particular data object based on the action being considered. Deployment of a proxy object may affect one set of the other data objects (objects lower in the hierarchy or closer to the leaf nodes), whereas, demotion may effect a different set of other data objects (objects higher in the hierarchy or further from the leaf nodes). Therefore, depending on the action, some relationships may be important and others may not.

While this may sound simple, many objects may reference other objects. Therefore, deploying or demoting a data object may cause unintended complications that are undesired. For example, during deployment, the proxy object being deployed may refer to another data object that does not exist because it has previously been removed or never existed. Conversely, demoting a base or leaf node object may cause other consequences for compound objects that include the base or leaf node object.

All of the file, records, and objects within the current object may be thought of as nodes that constitute a graph and reference relationships are represented the arcs of the graph. The arcs may be thought of as being different colors for the different annotations for the various functions (e.g., deployment, demotion, etc.). CMS 240 can traverse the graph and return all the nodes that are encountered for a specific color of arcs. The order of execution for a set of nodes may be a function of the policy being used. Referential integrity constraints between the table for the peripheral row and the primary table of the referenced object may be examined. If there are integrity constraints that need to be enforced, CMS 240 takes that into account when doing the traversal. For deployment, the referenced object should precede the referring object in the ordering result that CMS 240 returns from the traversal.

In addition to logical relationships, physical dependencies may be important. If the order is followed, the integrity constraints in the database will not be violated. Referential integrity constraints in databases should be maintained and are most commonly typified by what are called foreign key-primary key constraints. For example, two different tables may be used. A referenced table has a primary key, and a referencing table has a foreign key with the value of the primary key in the referenced table. If rows are to be inserted into both tables, the referenced table gets its row before the referencing table gets its corresponding row. Performing the insertion in the reverse order violates the integrity restraints. In this manner, a user can describe the data, and CMS 240 will make sure that data gets shepherded properly from stage to stage. Such automation can allow almost any employee of a company to enter data and perform operations without having to address low-level programming concerns.

The content type object can comprise an XML document of a structured definition of the content type. A business user can model the content type based on the content structure desired by the business user. The business user may specify business rules that a content type object or content instance object created from the content type will need to follow, and levels of access to the associated data objects.

GUI 290 may present a user with one or more entry forms. Each attribute in the entry form can include a configurable control with an Extensible Style Language Transformation ("XSLT"). GUI 290 may allow the content types to model complex database relationships, such as one to one (employee/image of employee), one to many (product category/SKUs for products within the product category), and many to many (articles/authors).

The content type may have its dependencies managed by containment, reference, or a combination of them. For containment, all data for a content type can be created, updated, deleted, versioned, associated, staged (put through a workflow), and published (deployed) as a single entity. As an example, a content type may contain several different records that are parts of different databases. For reference, all objects referenced within a content instance object (instantiated from the content type) may or may not be processed together. If a referenced object has already been deployed, it may not be re-deployed when the content instance object referencing it is deployed.

GUI 290 can be configured to include many extensibility points. For instance, an XML Schema Definition ("XSD") can be added. XSD can be a structured definition for a valid XML document in lieu of a Document Type Definition ("DTD"). XSD allows a user to define complex data types for the document. The content type can be generated so that it overrides a content management applications presentation for a Java Server Page ("JSP"). Custom controls may be added to allow data selection from other data sources. A default workflow process can be associated with each content type.

Figure 3:
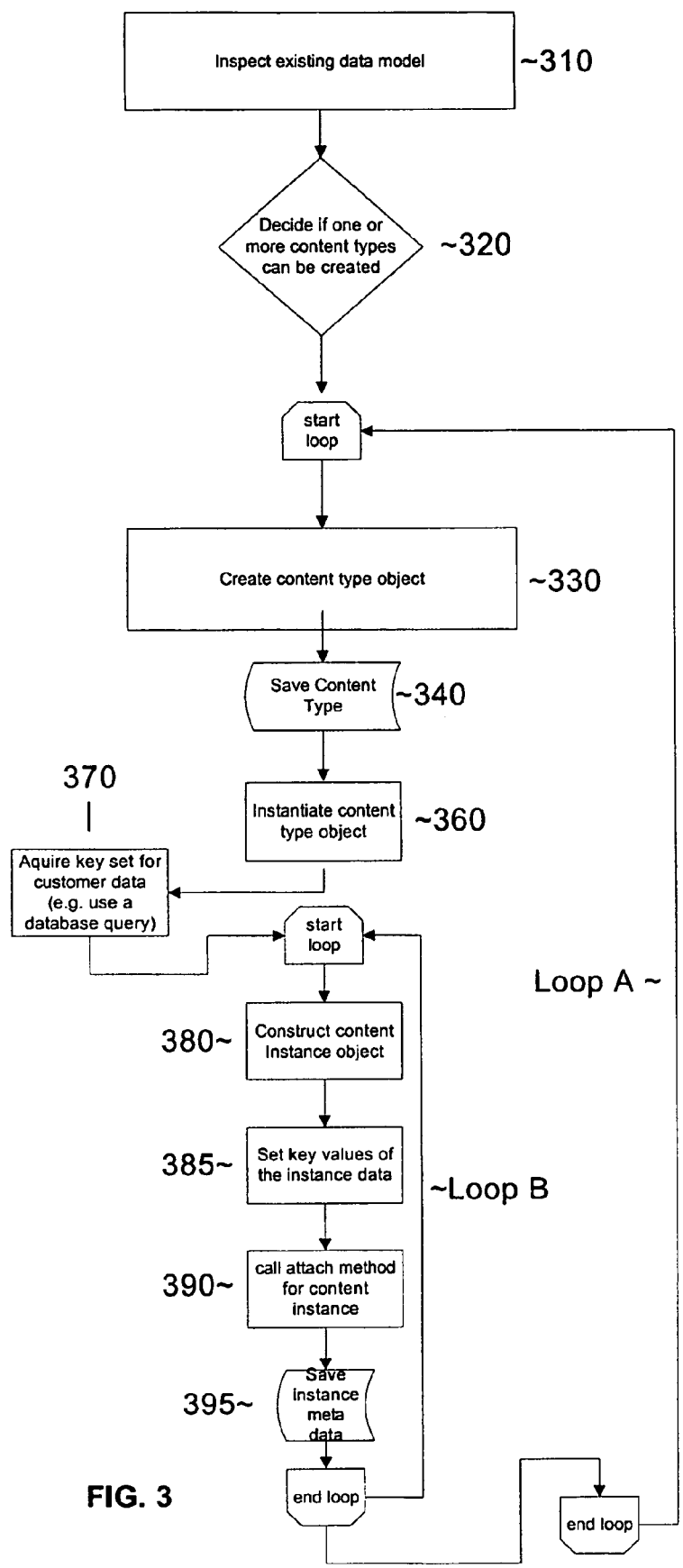
FIG. 3 is a flow diagram of an embodiment of a method of migrating legacy data to a content management system.

Turning now to FIG. 3, one embodiment of a method for using these aforementioned content types to integrate legacy data into a content management system of the type described above is depicted. Generally this is accomplished by inspecting the data to generate a set of content types 310, 320, which can be used to represent the data to be migrated. These content types can be persisted (saved) 340 and used to instantiate content type objects 330. These content types can then be used to instantiate content instance objects 380 which in turn can have their key values set 385, and be attached to particular data 390. These content instance objects can then be persisted 395 to allow a CMS 240 to manage the legacy data without manipulating it directly.

Thus, existing user data can be migrated to a content management system using content types via an attach methodology. In one embodiment, step one in the process is the inspection of the schema and identification of the relationship. Step two is the creation of content type object(s) to model the existing user schema. Step three is an automated task to create content instance objects (content items) of the relevant types. Step four uses an attach method to take over the existing data by associating the data with content instance objects. The following is an example of the migration using the described embodiment: The user has a simple article table with an id, title, and body. The table has 10,000 rows in it and the user want to migrate to Athena. The user creates a content type called "Article" with three attribute definitions and a single top relation. The user may then runs a Java program that instantiates the article type, and iterates over the 10,000 articles to be created. Within the loop, the article factory is used to create a content object instance (the user may supply the primary key of the article when constructing the instance), the attach method is used to take over the data, and the content instance object is persisted. Any default workflow defined at the type level will fire when the instance is committed.

Embodiments of the invention involve attaching to existing legacy data when, typically, a model of the data resides in a relational database or with some repository. In one embodiment, the invention facilitates mapping that legacy data onto a new content management structure that has content types defined for that user data and is designed to keep associated metadata related to content management. Instead of having to import all of the legacy data into a proprietary repository or something similar, the user can merely create content types based on the data users' existing model and then use an attach method to allow the new system to take over management of their existing data.

More specifically, embodiments of the method for migration of data may begin with the inspection of a users model 310, 320 to take inventory of the data. This analysis may involve an analysis of a user's or customer's business, the type of data that the business requires the user to keep, the attributes the data must have and the way in which the data is stored, utilized, and related. This inspection allows a gathering of the requirements for the content types to be generated. For example, a data model could include articles, authors, images and relationships between those entities.

At this point it can be decided if content types can be created for the data set 320 which would facilitate the management of the data, and allow relations between the data to be expressed. If content types can be defined, a content type object must be created for each content type discerned within the data inspected. For each of those content types, data can then be found which falls under the rubric of that content type. The content type can be used to instantiate a content type object 330 which can in turn be used to instantiate a constant instance 380 that can be attached to a piece of data 340 and persisted 395 (Loop A).

For each content type discovered 320 within the data to be migrated, first a content type object must be created 330. In some embodiments these content type objects may be created using a content modeler presented by a GUI 290 as described above. The content type can then be persisted in the content management system to which we are migrating by saving the content type 340. Each content type may then be iterated over to instantiate a content type object 360, and create content instance objects 380 (Loop B).

Embodiments of the invention may iterate over the content types persisted. For each content type that is persisted, a content type object is instantiated 360. For each of these content type objects, the data to be migrated can then be analyzed, and for each piece of data which falls under the rubric of that content type a content instance object can be created 380. In one particular embodiment, a key set for the data is acquired by analyzing the set of data to be migrated 370. This key set may be acquired manually, or may be generated automatically by utilizing a set of database queries. After the key set for the data is acquired 370, the data can then be further analyzed to see which pieces of data match a content type. When data is found which matches a content type a content instance object may be constructed 380. This can involve looking at the content type and using the content type object to instantiate a content instance object based on the content type. In some embodiments, a Java program can be used to automatically locate data which match a content type and create the content instance objects for this data which match a content type.

After the content instance object is created the key values of the content instance object can be set to match or represent the key values of the data 385. This content instance object with the key values set can then be associated or attached to the particular piece of data which the content instance object represents 390. In many embodiments this is done with a method, which is part of the content instance class from which a particular content instance object is instantiated. This attach method allows key values or an identifier to be assigned to the content instance object and the object associated with a particular piece of data. This content instance object can then be persisted 395 by the content management system. Data can then be managed by CMS 240 using these saved content instance objects. In this way data from a legacy database can be integrated in a content management system without the need to manually enter the data to the content management system, or to modify the legacy data in any way.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for integrating legacy data into a content management system computer, comprising:
    analyzing a set of legacy data residing in a legacy data repository on a persistent data source computer connected to said content management system computer over a network;
    generating a set of content types to represent the set of legacy data in the content management system based on the analysis of the legacy data, wherein at least one of said set of content types is defined by a user through a graphical user interface of a client computer connected to said content management system computer over said network, wherein one of the content types comprises a policy annotation, and wherein the policy annotation comprises management information for putting content instance objects created from the content type through a workflow associated with the content type;
    saving the set of content types in a memory of said content management system computer;
    generating a set of content type objects corresponding to the set of content types, wherein a content type object is an instantiation of a content type embodied in the content management system;
    generating a set of content instance objects from the content type objects, wherein each content instance object is an instantiation of a content instance and is associated with a content type object or a content type;
    associating each of the set of legacy data with at least one of the content instance objects, wherein at least one of the content instance objects is associated with two or more datum of the set of legacy data, each of the datum residing in a distinct data storage device on said network; and
    managing the set of legacy data residing in the legacy data repository on said persistent data source computer using the content instance objects generated by the content management system computer, wherein the two or more datum are managed by said content management system over said network as a single entity using the at least one content instance object.

2. The method of claim 1, wherein generating the set of content types comprises specifying attributes associated with the content type.

3. The method of claim 1, comprising, for each of the set of content types, analyzing the legacy data to obtain a first set of the legacy data corresponding to the content type.

4. The method of claim 3, comprising analyzing the legacy data to generate a set of keys associated with the legacy data.

5. The method of claim 4, comprising generating values for the set of keys for each of the content instance objects and associating the values with the content instance object.

6. The method of claim 5, wherein the values are acquired by querying the legacy data repository.

7. The method of claim 3, wherein each of the set of content type objects is a structured definition of the corresponding content type.

8. The method of claim 7, wherein each of the content type objects is an XML document.

9. The method of claim 7, wherein each of the set of content types have associated access controls or policies.

10. The method of claim 9, comprising managing the set of legacy data using the workflows, access control or policies associated with each of the set of content types.

11. The method of claim 9, wherein the content instance objects are stored at a location remote from the legacy data repository.

12. The method according to claim 1, further comprising:
    setting key values of said content instance object to match or represent key values of a corresponding piece of legacy data residing in said legacy data repository.

13. The method according to claim 1, wherein said legacy data repository comprises a legacy database.

14. The method according to claim 1, further comprising:
    enabling said user to perform said policy annotation in defining said at least one of said set of content types through said graphical user interface of said client computer connected to said content management system computer over said network.

15. A computer program product comprising one or more computer readable storage media storing computer instructions translatable by a processor to perform:
    analyzing a set of legacy data residing in a legacy data repository connected to a content management system computer over a network;
    generating a set of content types to represent the set of legacy data in the content management system based on the analysis of the legacy data, wherein at least one of said set of content types is defined by a user through a graphical user interface of a client computer connected to said content management system computer over said network, wherein one of the content types comprises a policy annotation, and wherein the policy annotation comprises management information for putting content instance objects created from the content type through a workflow associated with the content type;
    saving the set of content types in a memory of said content management system computer;
    generating a set of content type objects corresponding to the set of content types, wherein a content type object is an instantiation of a content type embodied in the content management system;
    generating a set of content instance objects from the content type objects, wherein each content instance object is an instantiation of a content instance and is associated with a content type object or a content type;
    associating each of the set of legacy data with at least one of the content instance objects, wherein at least one of the content instance objects is associated with two or more datum of the set of legacy data, each of the datum residing in a distinct data storage device on said network; and managing the set of legacy data residing in the legacy data repository on said persistent data source computer using the content instance objects generated by the content management system computer, wherein the two or more datum are managed by said content management system over said network as a single entity using the at least one content instance object.

16. The computer program product of claim 15, wherein the computer instructions are further translatable by the processor to perform:

for each of the set of content types, analyzing the legacy data to obtain a first set of the legacy data corresponding to the content type.

17. The computer program product of claim 16, wherein the computer instructions are further translatable by the processor to perform:

analyzing the legacy data to generate a set of keys associated with the legacy data.

18. The computer program product of claim 17, wherein the computer instructions are further translatable by the processor to perform:

generating values for the set of keys for each of the content instance objects and associating the values with the content instance object.

19. The computer program product of claim 18, wherein the values are acquired by querying the legacy data repository.

20. The computer program product of claim 15, wherein each of the set of content types has associated access controls or policies.

21. The computer program product of claim 20, wherein the computer instructions are further translatable by the processor to perform:

managing the set of legacy data using the workflows, access control or policies associated with each of the set of content types.

22. The computer program product of claim 15, wherein the computer instructions are further translatable by the processor to perform:

setting key values of said content instance object to match or represent key values of a corresponding piece of legacy data residing in said legacy data repository.

23. The computer program product of claim 15, wherein the computer instructions are further translatable by the processor to perform:

enabling said user to perform said policy annotation in defining said at least one of said set of content types through said graphical user interface of said client computer connected to said content management system computer over said network.

24. A system, comprising:

a legacy data repository storing legacy data;

a content management system connected to the legacy data repository over a network; and one or more client computers connected to the content management system, wherein the content management system embodies a computer program product comprising one or more computer readable storage media storing computer instructions translatable by a processor to perform:

analyzing a set of legacy data residing in the legacy data repository;

generating a set of content types to represent the set of legacy data in the content management system based on the analysis of the legacy data, wherein at least one of said set of content types is defined by a user through a graphical user interface of a client computer connected to said content management system computer over said network, wherein one of the content types comprises a policy annotation, and wherein the policy annotation comprises management information for putting content instance objects created from the content type through a workflow associated with the content type;

saving the set of content types in a memory of said content management system computer;

generating a set of content type objects corresponding to the set of content types, wherein a content type object is an instantiation of a content type embodied in the content management system;

generating a set of content instance objects from the content type objects, wherein each content instance object is an instantiation of a content instance and is associated with a content type object or a content type;

associating each of the set of legacy data with at least one of the content instance objects, wherein at least one of the content instance objects is associated with two or more datum of the set of legacy data, each of the datum residing in a distinct data storage device on said network; and managing the set of legacy data residing in the legacy data repository on said persistent data source computer using the content instance objects generated by the content management system computer, wherein the two or more datum are managed by said content management system over said network as a single entity using the at least one content instance object.

* * * * *